Figure 1:
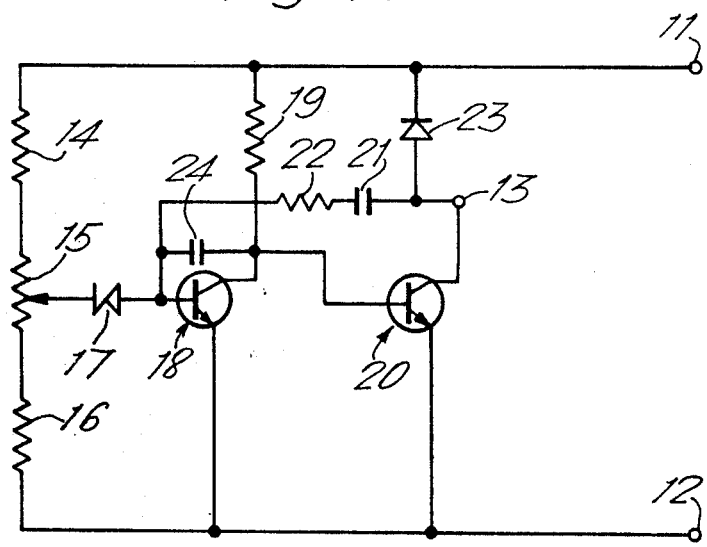

United States Patent

[11] 3,581,205

| [72] | Inventor | Raymond Michael Christopher Wilson<br>Birmingham, England |
|---|---|---|
| [21] | Appl. No. | 810,110 |
| [22] | Filed | Mar. 25, 1969 |
| [45] | Patented | May 25, 1971 |
| [73] | Assignee | Joseph Lucas (Industries) Limited<br>Birmingham, England |
| [32] | Priority | Jan. 15, 1969 |
| [33] | | Great Britain |
| [31] | | 2396/69 |

[54] APPARATUS FOR TESTING SWITCHING TYPE VOLTAGE REGULATORS BY COUNTING SQUARE WAVE PULSES PRODUCED BY THE REGULATOR
1 Claim, 2 Drawing Figs.

[52] U.S. Cl. .................................................. 324/158,
324/73
[51] Int. Cl. ..................................................G01r 31/28,
G01r 15/12

[50] Field of Search......................................... 324/28,
158, 28 (VR), 73; 317/33 (VR)

[56] References Cited
UNITED STATES PATENTS
| 2,957,138 | 10/1960 | Greco............................ | 324/158 |
| 3,426,265 | 2/1969 | Till............................... | 317/33X |

*Primary Examiner*—Rudolph V. Rolinec
*Assistant Examiner*—Ernest F. Karlsen
*Attorney*—Holman, Glascock, Downing and Seebold ABSTRACT: In the testing of a voltage regulator of the kind in which the regulator provides an output voltage of square wave form to a field winding, a signal is injected into the regulator representing the signal which the regulator will receive in use from a generator. The output from the regulator, which will be of square waveform, is then fed to a counter, and an indication that the regulator is working satisfactorily is given when a predetermined number of square waves have been counted.

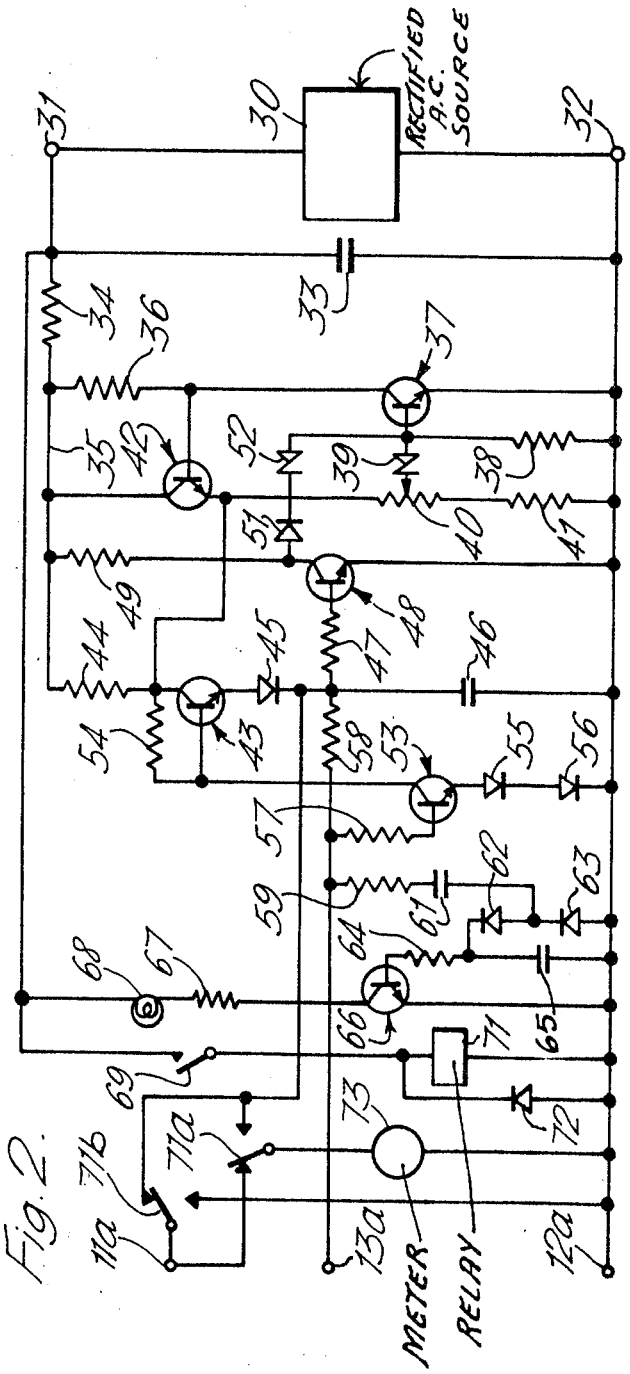

APPARATUS FOR TESTING SWITCHING TYPE VOLTAGE REGULATORS BY COUNTING SQUARE WAVE PULSES PRODUCED BY THE REGULATOR

This invention relates to the testing of voltage regulators of the kind which are used in battery charging systems on road vehicles and comprising a pair of input terminals for connection to the generator of the vehicle, a field terminal for connection to the field winding of the generator, and switching means sensitive to the output voltage of the generator for providing at said field terminal a square wave output the mark-space ratio of which is varied in accordance with the output voltage of the generator to vary the current flow in said field winding and so maintain the generator output voltage substantially constant.

In one aspect, the invention resides in apparatus for testing a voltage regulator of the kind specified, the apparatus including a unit having output terminals for connection to the input terminals of the voltage regulator, an input terminal for connection to the field terminal of the voltage regulator, a simulator for producing at said output terminals a signal which simulates the signal received by the voltage regulator from the generator in use, a counter for counting a predetermined number of square waves received by said unit from the field terminal and giving an indication when the predetermined number has been received, and means within said unit for preventing damage to the unit by faults within the voltage regulator.

In another aspect, the invention resides in a method of testing a voltage regulator of the kind specified in which a signal simulating the signal which the regulator receives from a generator in use is fed into the regulator, and square waves received at said field terminal are counted, an indication that the regulator is operating satisfactorily being given after a predetermined number of square waves have been counted.

In the accompanying drawings:

FIG. 1 is a circuit diagram of a known type of voltage regulator which can be tested in accordance with the invention, and FIG. 2 is a circuit diagram of one example of apparatus in accordance with the invention.

Referring first to FIG. 1, the voltage regulator includes input terminals 11 and 12 which in use are connected to the positive and negative terminals of a vehicle battery which is charged by a generator, preferably an alternator and associated full wave rectifier. The generator includes a field winding which is connected between a field terminal 13 forming part of the regulator and a terminal 11.

Connected between the terminals 11 and 12 is a resistance chain 14, 15, 16 a variable point on the resistor 15 being connected through a Zener diode 17 to the base of an NPN transistor 18, the emitter of which is connected to the terminal 12 and the collector of which is connected through a resistor 19 to the terminal 11. The collector of the transistor 18 is further connected to the base of an NPN transistor 20, the emitter of which is connected to the terminal 12 and the collector of which is connected to the terminal 13. The terminal 13 is connected to the base of the transistor 18 through a capacitor 21 and resistor 22 in series, and is further connected to the terminal 11 through a diode 23. A capacitor 24 is connected between the base and collector of the transistor 18 to minimize radio interference.

In use, when the output voltage of the generator is below a predetermined value, the Zener diode 17 is nonconductive and the transistor 18 is off, so that current flowing through the resistor 19 turns on the transistor 20, which provides current to the field winding. When a predetermined voltage is reached, the Zener diode 17 conducts and turns the transistor 18 on, so that current flowing through the resistor 19 is diverted through the transistor 18. The feedback connection through capacitor 21 and resistor 22 causes the circuit to oscillate between one state in which the transistor 20 is fully off and the transistor 18 is fully on, and a second state in which the transistor 20 is fully on and the transistor 18 is fully off, the mark-space ratio being determined by the current flowing through the Zener diode 17, which in turn is determined by the voltage between the terminals 11, 12. Thus, a square wave is produced in the field winding, the mean level of current being regulated by the current flowing through the Zener diode 17 to maintain the output voltage of the generator substantially constant. The diode 23 is provided to conduct back-e.m.f. generated in the field winding.

Referring now to FIG. 2, the testing apparatus includes a rectified AC source 30 supplying power to a positive terminal 31 and a negative terminal 32. The apparatus further includes terminals 11a, 12a and 13a which in use will be connected to the terminals 11, 12 and 13 in FIG. 1. The terminal 32 is connected to the terminal 12a, and conveniently is earthed, and whilst the terminal 31 is connected through a resistor 34 to a supply line 35, the terminals 31 and 32 being bridged by a smoothing capacitor 33.

Connected in series between the line 35 and terminal 32 are a resistor 36 and the collector-emitter path of an NPN transistor 37. The base of the transistor 37 is connected to the terminal 32 through a resistor 38, and is further connected through a Zener diode 39 to a variable point on a resistor 40, one end of which is connected to the terminal 32 through resistor 41, and the other end of which is connected to the emitter of an NPN transistor 42, the collector of which is connected to the line 35 and the base of which is connected to the collector of the transistor 37. The emitter of the transistor 42 is connected to the collector of an NPN transistor 43, the collector of which is further connected to the line 35 through a resistor 44 and the emitter of which is connected through a diode 45 and a capacitor 46 in series to the line 32. The junction of the diode 45 and capacitor 46 is connected through a resistor 47 to the base of an NPN transistor 48, the emitter of which is connected to the terminal 32 and the collector of which is connected to the line 35 through a resistor 49. The collector of the transistor 48 is further connected through a diode 51 and a Zener diode 52 to the base of the transistor 37.

The base of the transistor 43 is connected to the collector of an NPN transistor 53, the collector of which is further connected through resistor 54 to the collector of the transistor 43. The emitter of the transistor 53 is connected through a pair of diodes 55 and 56 in series to the terminal 32, whilst its base is connected through a resistor 57 to the terminal 13a, which is further connected through a resistor 58 to the junction of the diode 45 and capacitor 46. A further connection from the terminal 13a is made through a resistor 59 and a capacitor 61 in series to the cathode of a diode 63 and the anode of a diode 62, the anode of the diode 63 being connected to the terminal 32 and the cathode of the diode 62 being connected to the junction of a resistor 64 and capacitor 65 connected in series between the base of an NPN transistor 66 and a terminal 32. The transistor 66 has its emitter connected to the terminal 32 and its collector connected through a resistor 67 and warning lamp 68 in series to the terminal 31, which is also connected through a manually operable contact 69 and a relay 71 in series to the terminal 32. The relay 71 is bridged by a diode 72, and operates a pair of contacts 71a and 71b. When the relay is deenergized, the contact 71b connects the terminal 11a to the cathode of the diode 45 and the contact 71a connects a meter 73 between the terminal 12a and the terminal 11a. Energization of the relay 71 moves the contacts 71a, 71b so that the terminal 11a is connected to the terminal 12a and the meter 73 is connected between the terminal 12a and the cathode of the diode 45.

The apparatus operates to provide between the cathode of diode 45 and the terminal 32 a signal which simulates the effect of a generator. This signal is applied to the voltage regulator, which if it is correctly operating, produces a square wave output at its terminal 13, which is fed by way of the terminal 13a back into the apparatus, which counts a predetermined number of pulses, after which the lamp 68 is illuminated to indicate that the regulator is satisfactory. A further test is then made to establish the diode 23 in the regulator is satisfactory, in a manner to be explained.

Referring to the circuit in detail, the capacitor 33 smooths the output from the source 30 which where necessary employs antisurge fuses to cope with the high initial charging current when the unit is switched on. The transistors 37, 42, Zener diode 39 and resistor 41, 40, 38 and 36 form a voltage regulator of known form which determines the voltage between the line 35 and terminal 32. The transistor 42 receives base current by way of the resistor 36, and if the voltage of the line 35 rises above a predetermined value which is selected by varying the tapping point on resistor 40, then the Zener diode 39 conducts to provide base current to the transistor 37, conduction of which removes base current from the transistor 42.

The alternator simulator includes the diodes 55, 56 and 45, transistors 53 and 43, resistors 57, 58 and 54, and the capacitor 46. The diodes 55 and 56 form a nonlinear path between the emitter of the transistor 53 and the terminal 32, and maintain the emitter potential of the transistor 53 substantially constant whenever the transistor 53 is conducting. The transistor 53 acts as a single stage DC amplifier, the base-emitter current of which is derived from the terminal 13a and so is directed proportional to the field current which is being supplied by the regulator under test. The transistor 53 effects a phase change of 180° and its output controls the transistor 43 to provide an output at the cathode of the diode 45 to the terminal 11a. If the voltage regulator were used in a vehicle in conjunction with an alternator, the potential between the terminals 11a and 12a would be varied by the current flowing in the field winding. In the simulator, no current is applied to the field winding, but instead it flows by way of terminals 13 and 13a to control the transistor 53, which in turn controls the output of the transistor 43, so that the output between terminals 11a and 12a is regulated in the same way as when the voltage regulator is in use with an alternator.

It is essential to cater for various faults which can occur in the regulator, so that these faults do not damage the testing apparatus. When the testing apparatus is first connected, the output of the source 30 rises quickly towards its normal operating level, and the resistor 34 protects the capacitor 46, the diode 45 and the transistors 43, 42. When the unit is disconnected, the various capacitors in the circuit discharge, and the diode 45 is incorporated to prevent the discharge of capacitor 46 from damaging the transistor 43.

The transistor 48, resistors 47 and 49, diode 51 and Zener diode 52 are incorporated to prevent damage in the event that the regulator being tested contains an internal short circuit. When no such fault is present, the voltage across the capacitor 46 is always above a predetermined level, and the resistor 47 is chosen so that in this condition the transistor 48 is fully conductive. The resistor 49 limits the current flowing through the transistor 48 to a safe value. At this stage the Zener diode 52 does not conduct. If for any reason the terminals 11 and 12 in the regulator are interconnected, the capacitor 46 discharges rapidly when the testing apparatus is connected to the regulator, and the transistor 48 turns off. The Zener diode 52 now conducts to turn on the transistor 37 and so reduce the output current of the transistor 42 to a level at which the testing apparatus can operate satisfactorily in spite of the short circuit.

As previously explained, correct operation of the regulator is indicated by counting a predetermined number of square wave pulses. It is important to test the regulator in this way, rather than just to detect current flowing at the terminal 13a, because if the square wave pulses are not counted, the testing apparatus could indicate that a regulator was satisfactory whereas in fact the regulator was providing an output to the field winding all the time, without switching as required. The resistor 59, capacitor 61 and diodes 62 and 63 constitute a conventional diode pump circuit for charging the capacitor 65, and after a predetermined number of pulses have been received, the voltage across the capacitor 65 reaches a level at which the transistor 66 turns on, so illuminating the lamp 68. Thus all that is required in order to test the regulator is to connect the testing apparatus to the regulator, turn it on, observe that the meter 73 indicates a voltage within a predetermined prescribed range, and note illumination of the lamp 68. Failure of the lamp 68 to illuminate indicates a faulty regulator. A suitable number of square wave pulses is 20.

During the testing procedure mentioned above, the meter 73 indicates the output of the alternator simulator. This meter is also used to perform another test which is required to ensure that the regulator is satisfactory. During the testing operation thus far described, no test has been made of the diode 23, because the diode 23 only comes into operation when the field winding is connected, and conducts the reverse voltage across the field winding. A second test is now made to ensure that the diode 23 is satisfactory, and for this purpose the operator closes the switch 69 to energize the relay 71, which operates the contact 71a and 71b to connect the terminal 11a to the terminal 12a and the cathode of the diode 45 to the meter 73. The alternator simulator current now flows through the meter 73 to the terminal 12a, and a parallel path is completed by way of the resistor 58, terminals 13a, 13, the diode 23, terminals 11 and 11a and the contact 71b. If the diode is satisfactory, the transistor 53 will be turned off and the transistor 43 will conduct heavily, so that the meter 73 shows a very high reading which is chosen to be above the scale reading, but not sufficiently high to damage the meter 73. Thus, movement of the meter 73 to its full scale deflection indicates a satisfactory diode. If the diode is not satisfactory, the transistor 53 will conduct heavily, and a much smaller current will flow through transistor 43 and the meter 73 will show a very low reading, which is chosen to be off the other end of the scale.

Some voltage regulators of the general kind shown in FIG. 1 have four output terminals, one of which is intended for connection to a warning lamp. Two of these are, in effect, positive terminals, and such regulators can be tested in exactly the same way as described above. Conveniently, the testing apparatus incorporates one set of three terminals as shown for connection to a three terminal regulator, and a second set of four terminals for connection to a four terminal regulator, the set of four terminals being connected internally to the set of three terminals so that the operation is unaffected whether a four terminal or a three terminal regulator is under test.

Having thus described our invention what I claim as new and desire to secure by Letters Patent is:

1. Apparatus for testing a voltage regulator of the kind which are used in battery charging systems on road vehicles and comprises a pair of input terminals for connection to the generator of the vehicle, a field terminal for connection to the field winding of the generator, and switching means sensitive to the output voltage of the generator for providing at said field terminal a square wave output mark-space ratio which is varied in accordance with the output voltage of the generator to vary the current flow in said field winding and so maintain the generator output voltage substantially constant, the apparatus including a unit having output terminals for connection to the input terminals of the voltage regulator, an input terminal for connection to the field terminal of the voltage regulator, a simulator for producing at said output terminals a signal which simulates the signal received by the voltage regulator from the generator in use, a counter for counting a predetermined number of square waves received by said unit from the field terminal and giving an indication when the predetermined number has been received, means within said unit for preventing damage to the unit by faults within the voltage regulator, said apparatus being of the kind for testing a voltage regulator which is of the type specified and which regulator incorporates a diode connected between one of the input terminals and the field terminal, so as to be connected across the field winding in use to conduct energy stored in the field winding, the apparatus further including a biasing circuit for forward biasing said diode, switch means operable to control the forward biasing of said diode, and indicating means for showing that the diode is conducting.